United States Patent
Arian et al.

[15] 3,695,219
[45] Oct. 3, 1972

[54] CORRUGATED BOARD IMPREGNATION APPARATUS

[72] Inventors: Charles Mourad Arian, Montreal, Quebec; Hans Hermann Mahler, Ville D'Anjou, Quebec, both of Canada; Claude Cecil Hayes, Jr., Suffield, Conn.; Hal W. Tanner, Jr., Georgetown, S.C.

[73] Assignee: International Paper Company, New York, N.Y.

[22] Filed: July 13, 1970

[21] Appl. No.: 54,201

[52] U.S. Cl. .................118/50, 118/63, 118/66, 118/69, 118/317, 118/406, 118/DIG. 4
[51] Int. Cl. ....................B05c 7/02, B05c 11/06
[58] Field of Search..........118/317, 324, DIG. 4, 406, 118/301, 64, 69, 63, 66, 50, 50.1, 415, 408

[56] References Cited

UNITED STATES PATENTS

| | | |
|---|---|---|
| 1,592,824 | 7/1926 | Fairchild............118/317 UX |
| 1,864,806 | 6/1932 | Cumfer................118/324 X |
| 2,535,087 | 12/1950 | Munters................118/64 X |
| 3,070,064 | 12/1962 | Busse..................118/324 X |
| 3,267,902 | 8/1966 | Pritchard et al. .....118/324 X |
| 3,343,977 | 9/1967 | Gjesdal...............118/317 UX |

Primary Examiner—John P. McIntosh
Attorney—Lawrence W. Flynn

[57] ABSTRACT

A bundle of corrugated boards, having the fluted channels of the boards in substantially unidirectional alignment throughout the bundle are continuously advanced through an apparatus which comprises means for supporting the bundle, means for applying a compressive force against the outer surfaces of the bundle to maintain surfaces of adjoining boards in the bundle in tight abutment as the bundle advances, with at least a portion of the compression means forming the walls of a trough in the zone of impregnation with the bottom of the trough being defined by the upper surface of the bundle; the trough walls tightly abut against at least the upper portions of the outer surfaces of the bundle. Means are provided for delivering a liquid impregnating composition into the trough as the bundle advances through the trough. The trough communicates with the aligned fluted channels of the bundle. Since the individual members of the bundle are tightly compressed together, the impregnating liquid flows downwardly through the fluted channels of the boards without contacting the outer surfaces of the individual members of the bundle. When impregnation is completed, sequential means are provided for: first, circulating a gas through the fluted channels of the board bundle as it continuously advances to flush out excess impregnant; second, means for circulating a hot gas through the fluted channels of the bundle to drive off volatiles contained in the impregnating composition; third, circulating a second stream of the hot gas through the fluted channels of the dried bundle as it continuously advances to effectuate curing of the impregnant contained in the boards; and fourthly, delivering water into the fluted channels of the bundle as it continuously advances in order to humidify the boards.

16 Claims, 16 Drawing Figures

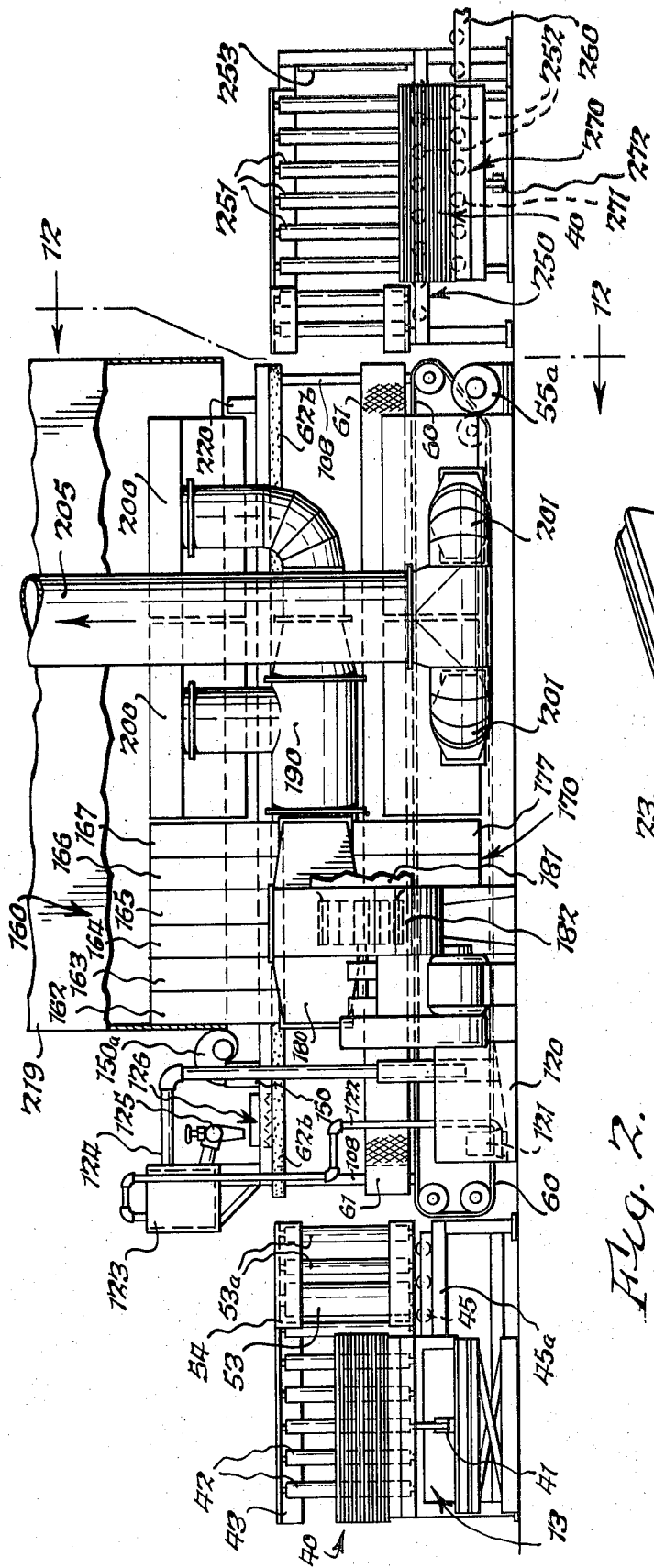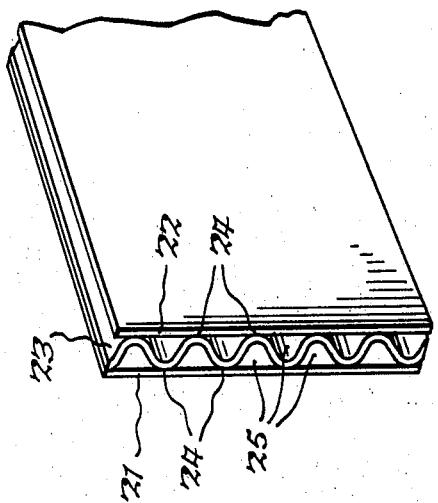

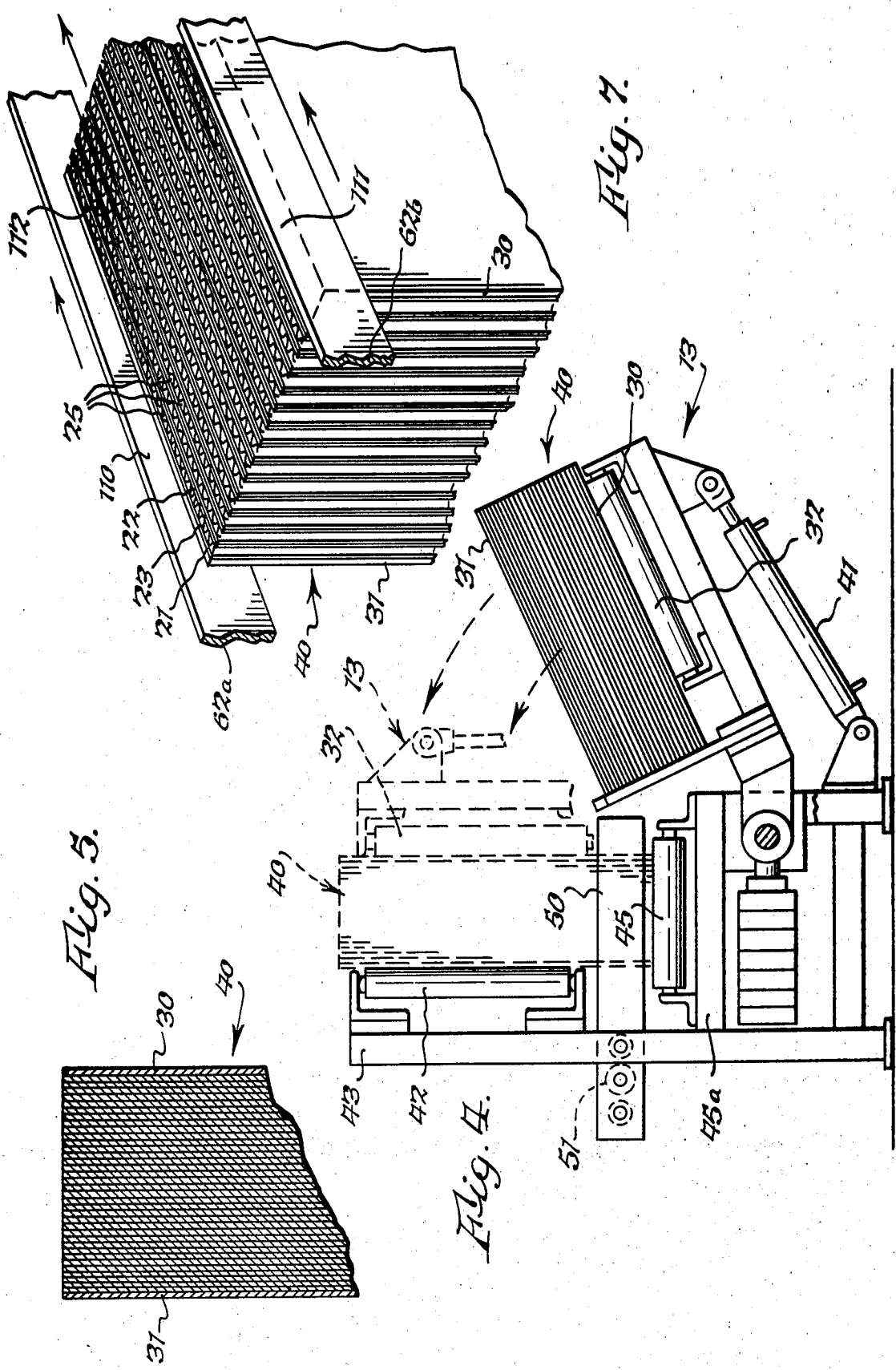

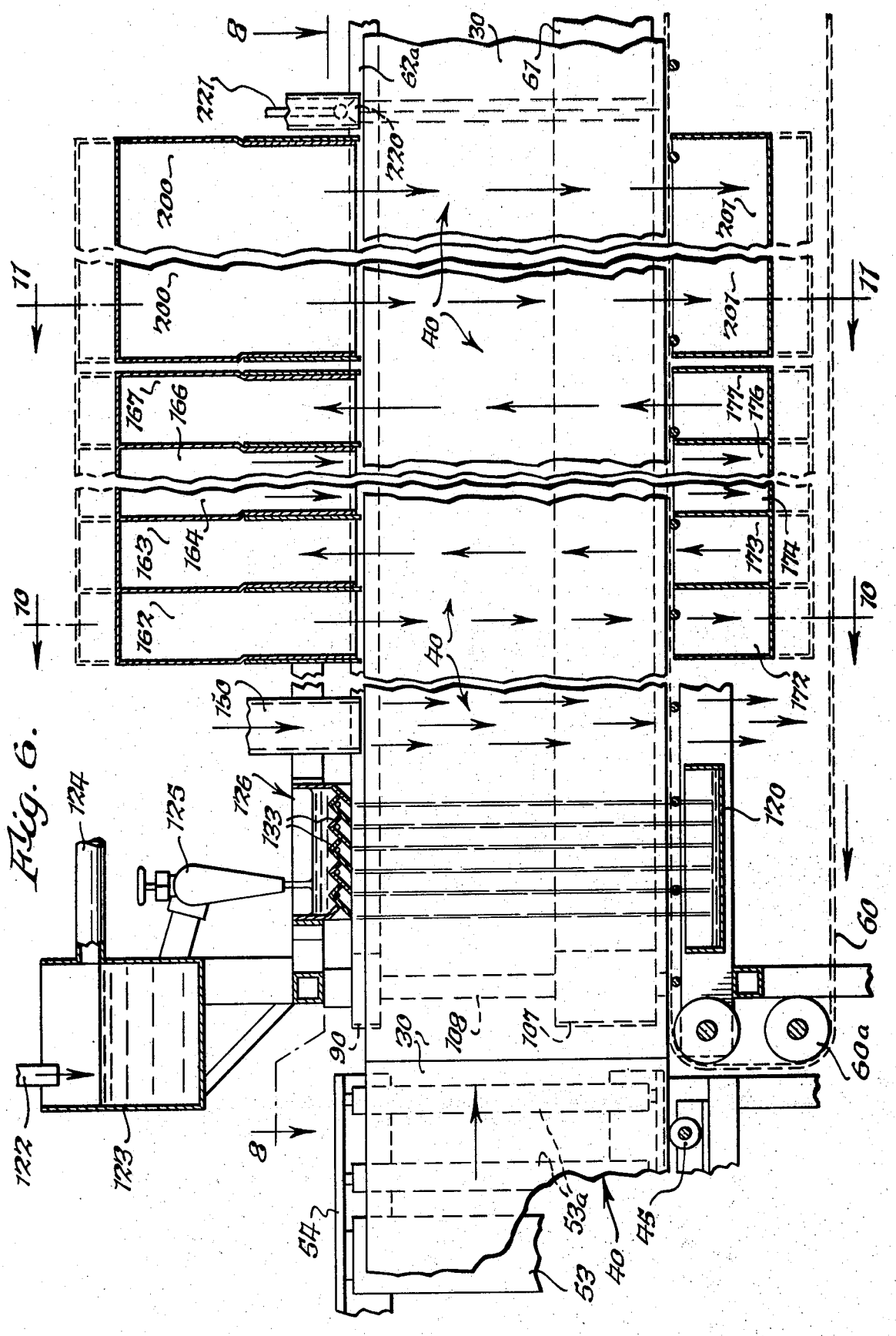

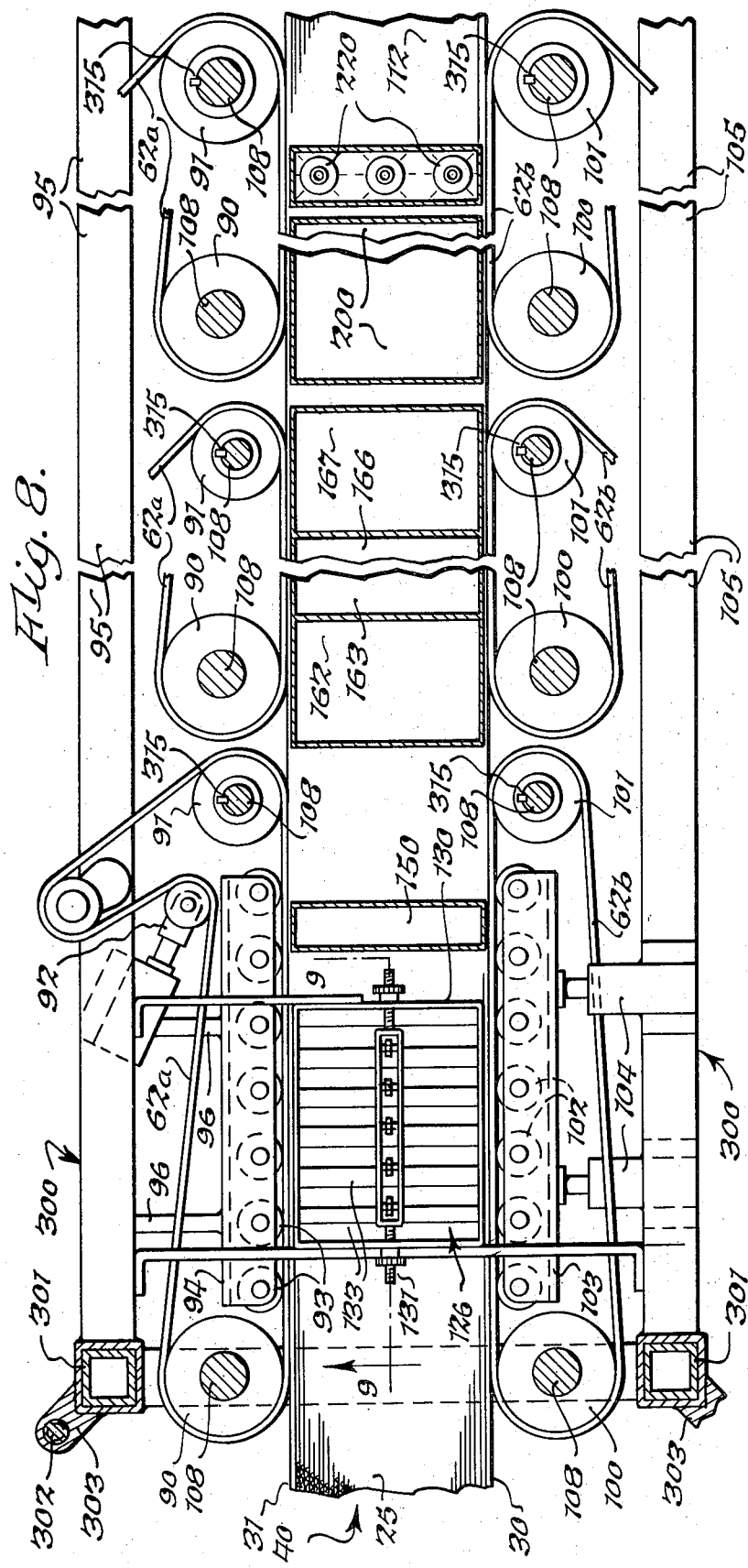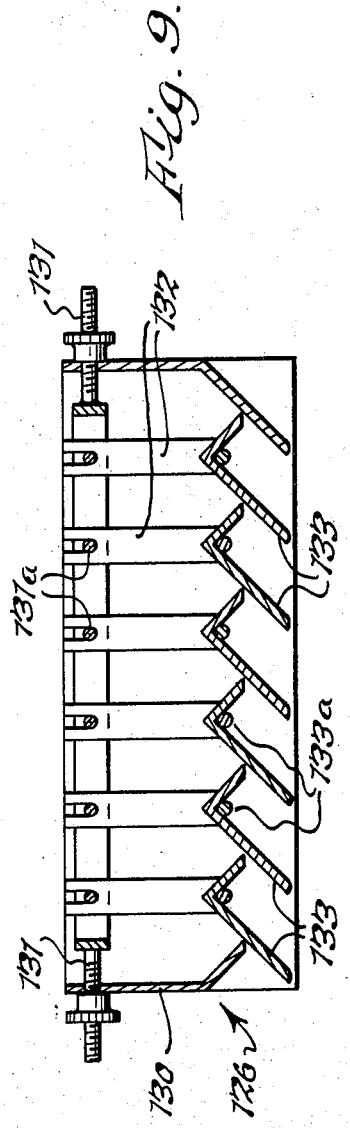

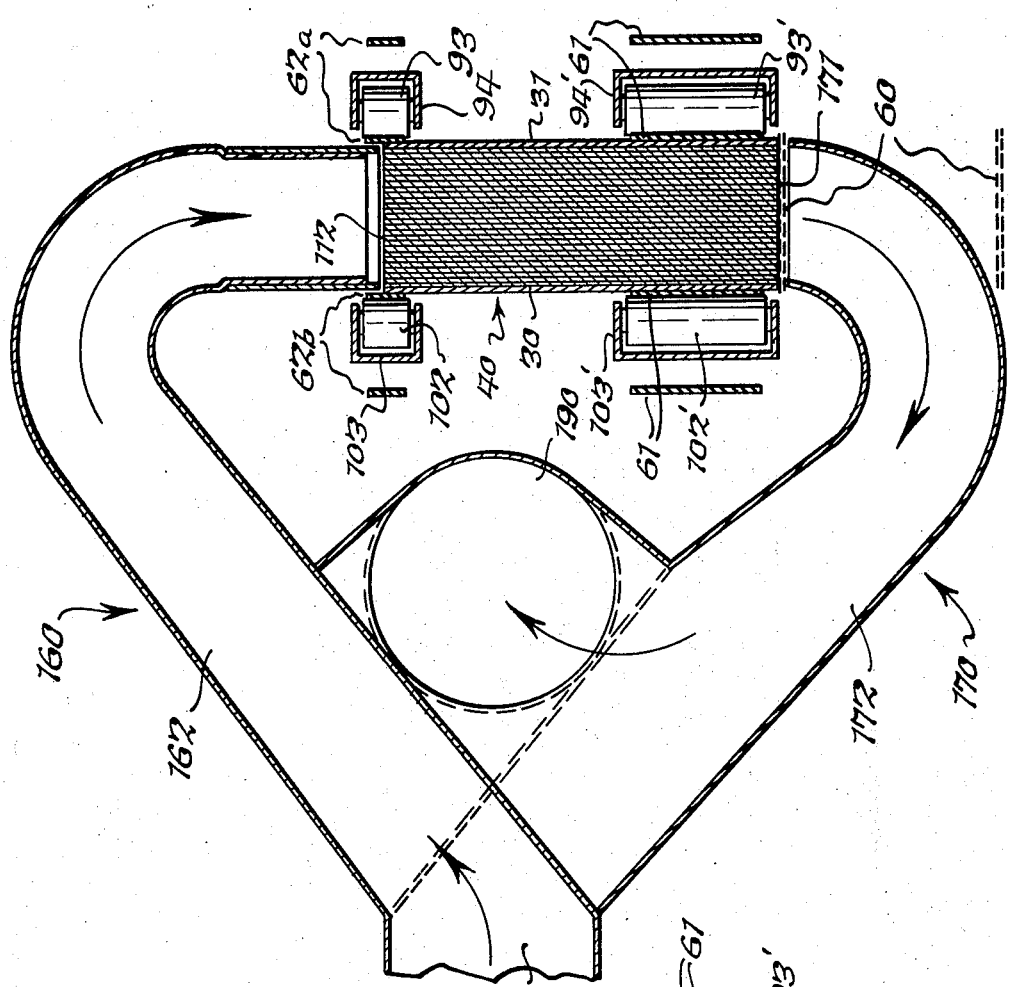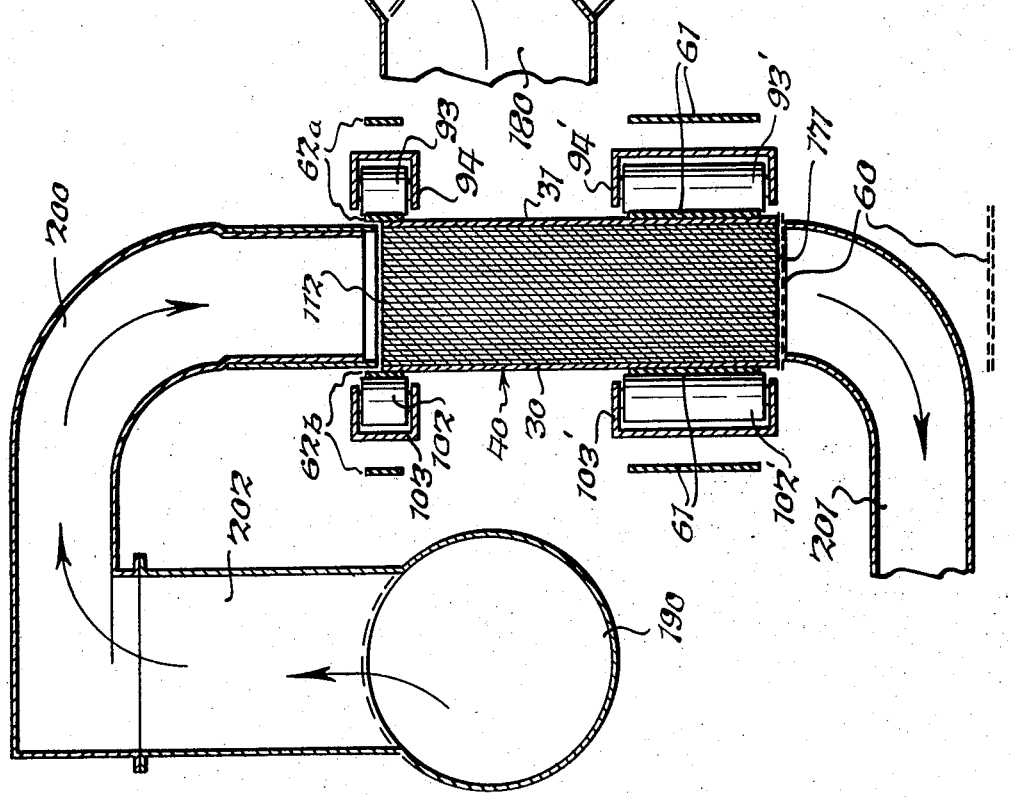

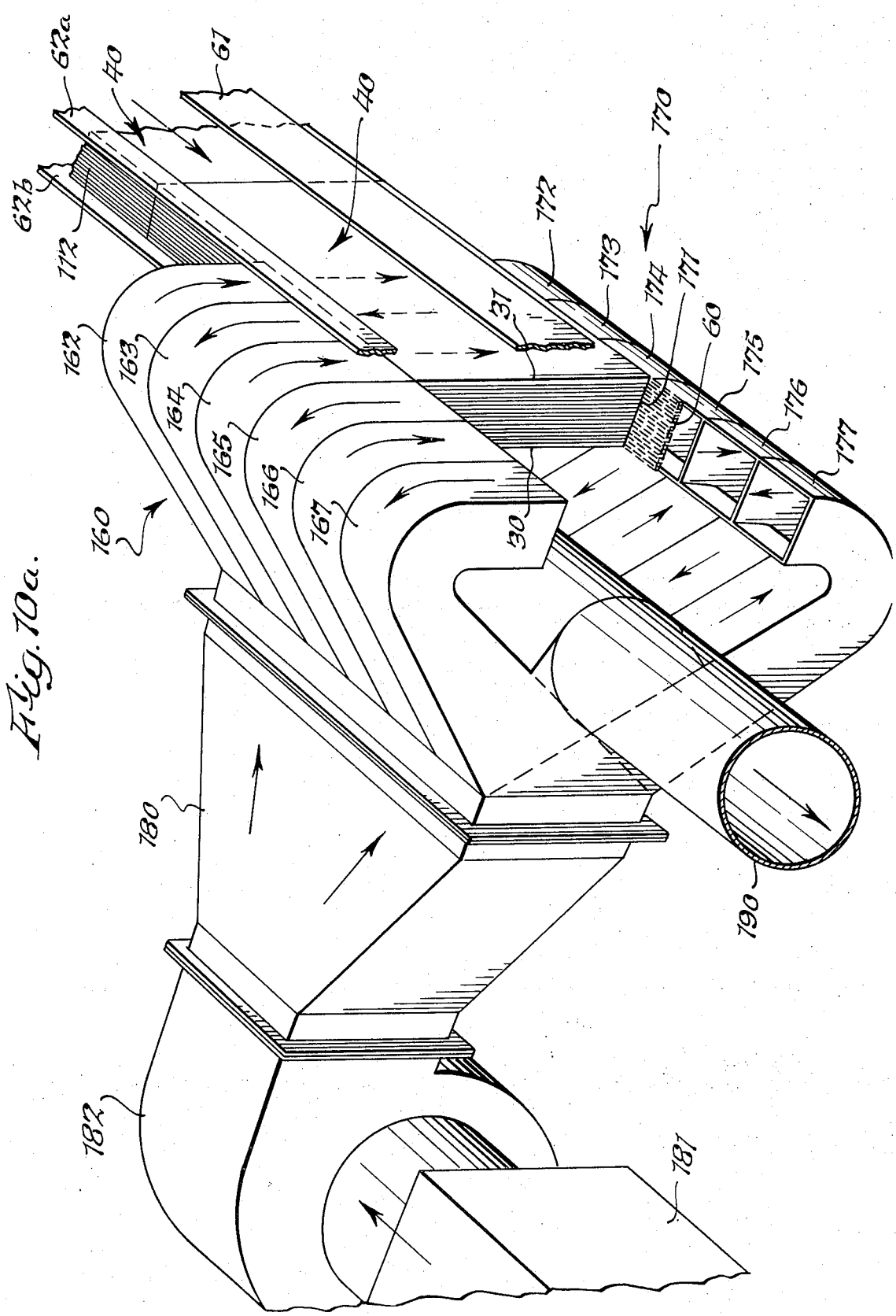

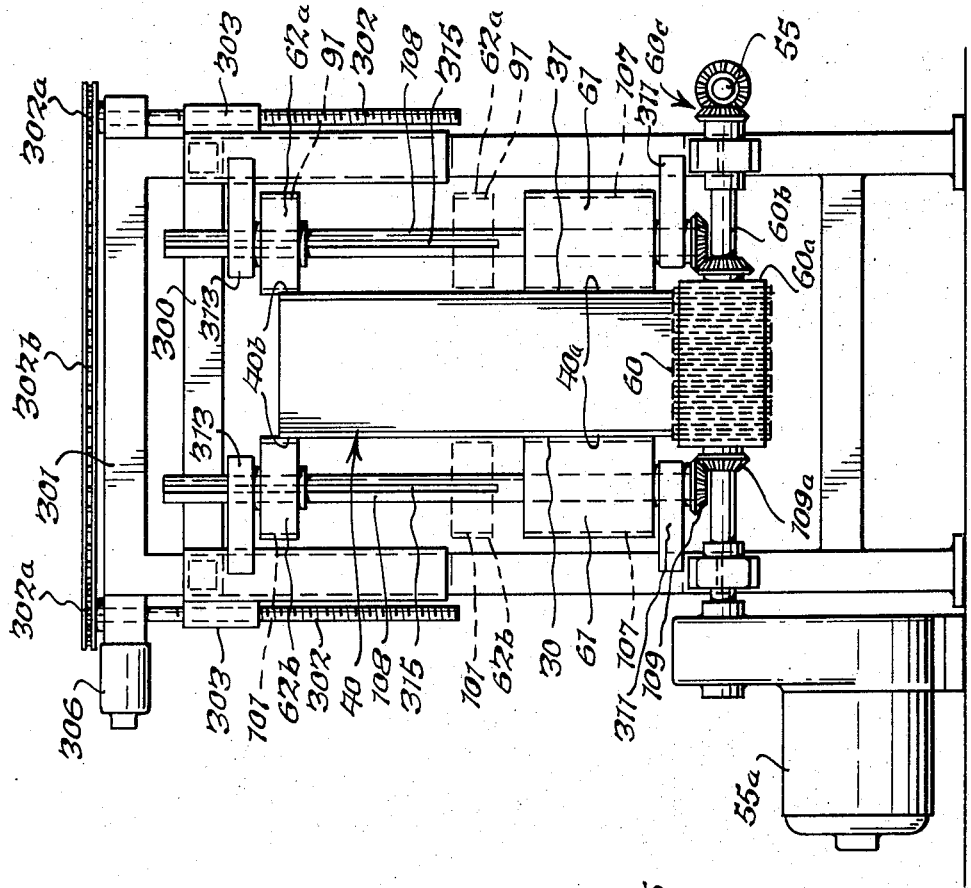
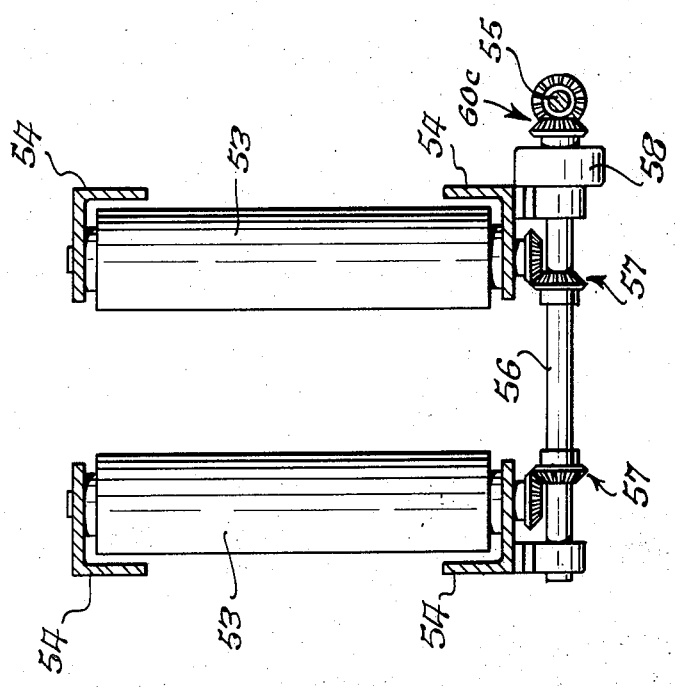

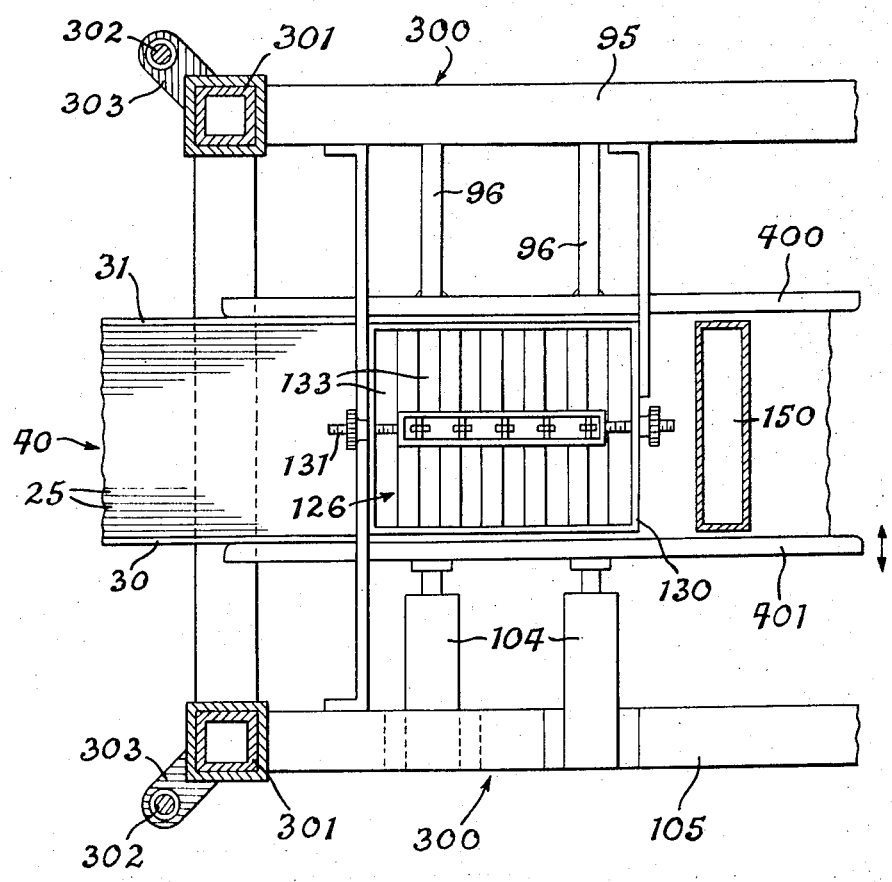

CORRUGATED BOARD IMPREGNATION APPARATUS

Novel liquid impregnating compositions are also provided generally comprising, in prescribed proportions, a heat curable polymeric material having the ability to impart wet rigidity to the board, a paraffinic wax which serves to plasticize the board and retard water absorption, minor amounts of a catalyst to effectuate curing of the resin, and a liquid carrier, such as water or a mixture of water and an organic liquid.

Boards impregnated in accordance with the above apparatus and method and employing the impregnating compositions of this invention are unique in that the fluted medium and the cover sheets between which the fluid medium is disposed are both impregnated with a material which imparts wet rigidity to the board except that the outer surfaces of the cover sheets remain substantially free from impregnant.

BACKGROUND OF THE INVENTION

This invention is primarily concerned with the impregnation of corrugated board with materials which enhance the characteristics of the board.

It is known that untreated corrugated board does not maintain its strength or rigidity when it becomes excessively moistened. Since there are numerous applications in which it is desirable to use corrugated board but which require that the boards be put in direct contact with water, it is often necessary to treat the corrugated board with any of a variety of agents, the function of which is to impart wet rigidity to the board. For example, corrugated board is widely used to package vegetables for shipment which are wet from prior treating with water. An example of such an application is the "Hydro-Cooling" process which has been developed for corn, celery, etc., and which requires that the vegetable container be dipped in or showered with water for an appreciable length of time. It is apparent that if the corrugated board container does not have a high degree of wet rigidity, the shipping box will lose its strength with time as the water associated with the vegetable contents is absorbed by the board.

A number of methods and materials have been heretofore proposed for imparting a wet rigidity to corrugated board. Wax is perhaps the most commonly used material for this purpose at present. The wax or other material used to impart wet rigidity to the board is impregnated into the board at some point during the manufacture of the board. Generally, there are three techniques which have been employed to introduce these impregnants. In one common technique, the impregnating liquid is drained into the fluted channel of the board to impregnate the fluted media and the cover sheets between which the fluted media is disposed. This technique is widely used for wax impregnation. A drawback in using this technique for processing a plurality of boards is that the wax has a tendency to drip down the external surfaces of the cover sheets as well as into the fluted channels of the board thereby creating a wax coating on the external surfaces of the board. This wax coating is not only undesirable from an aesthetic point of view, but also from a practical point of view since this can create the problem of adjoining boards having a tendency to stick together after processing. When wax is the impregnant, even though the wax is directed into the fluted channels of the board, the wax nevertheless penetrates through the cover sheets to the outside surface of the cover sheets to create a glazy appearance and texture to the board.

Another technique which has been employed is to simply dip the board into an impregnating liquid. This technique has the disadvantage of being cumbersome and messy and also produces an undesirable coating on the external surfaces of the cover sheets of the board.

In yet another technique, the individual components which go to make up the finished board are impregnated at some point prior to forming the corrugated board. A disadvantage of this technique is that the amount of impregnants which can be employed is generally limited because of the problem they can present during the subsequent corrugation step. For example, it can cause the components of the board to stick to the rolls in the corrugating machine. As a result, it is usually necessary to use reduced levels of impregnant with a consequently reduced level in the wet rigidity of the finished board.

It is a general object of this invention to provide an apparatus for continuously impregnating the fluted media and the inner portions of the two cover sheets between which the fluted media is disposed by employing a liquid containing one or more impregnating agents without bringing these impregnating agents into contact with the outer surfaces of the cover sheets of the board.

It is another object of this invention to provide an apparatus for impregnating a plurality of boards simultaneously without bringing the impregnant into contact with the outer surfaces of the cover sheets of any individual board.

It is another object of this invention to provide an apparatus for continually processing the output of a corrugating machine into a corrugated board having an unusually high wet rigidity.

These and other objects of this invention will be apparent to one skilled in the art from a total reading of this specification.

SUMMARY OF THE INVENTION

This invention relates to apparatus for impregnating a corrugated board.

APPARATUS

According to one aspect of this invention, an apparatus is provided for impregnating a corrugated board which comprises: conveyor means for continuously advancing a bundle comprising a plurality of corrugated boards in a given direction with the fluted channels of the board in substantially unidirectional alignment throughout the bundle. As the bundle advances, it is supported by a suitable support means, such as for example, an advancing endless belt. As the bundle of boards advances towards the impregnation zone of the apparatus, a compressive force is continuously applied to the outer surfaces of the outermost members of the advancing bundle, this force being preferably distributed over substantially the entire outer surfaces of these members in order to maintain the surfaces of adjoining boards within the bundle in tight abutment as the bundle advances. Typically this compressive force is exerted by means of one or more advancing endless belts disposed on each side of the bundle and communicating with the outer surfaces of the outermost members of the bundle. Means are provided for compressing these belts against the outer surfaces of the bundle so as to provide a tight abutment between the belts and the outer surfaces. The belts which contact the upper portion of the outermost surfaces of the bundle extend beyond the upper surface of the bundle to form the walls of a trough, at least in the zone of impregnation, the bottom of the trough being formed by the upper surface of the advancing bundle. The trough communicates with the aligned fluted channels of the advancing bundle.

The required compressive force can be applied by means other than belts. For example, the belts can be readily replaced by substantially frictionless board members which function to exert the required compressive force while simultaneously functioning as walls for the trough.

The apparatus further comprises means for continuously delivering a liquid impregnating composition into the trough defined above, whereupon the fluid passes into the channels of the boards making up the bundle to impregnate the interior surfaces of the board. Since the outer surfaces of the boards in a bundle are in tight abutment, substantially none of the impregnating liquid discharged into the trough will run down between the boards to coat the outer surfaces of the board. Moreover, since the belts or other means which are applying the compressive force to the bundle tightly abut the upper portion of the outer surfaces of the outermost members of the bundle, no leakage of impregnating liquids will occur between the trough walls and the outer surfaces of the outermost members of the bundle. The impregnating fluid can be discharged into the trough in numerous ways and at programmed points along the length of the trough if desired.

Once the board has been impregnated, means are provided for injecting a gas into and through the fluted channels of the advancing bundle to remove excess impregnating liquid which can be collected and recycled.

In the case where the impregnant is a heat curable polymeric resin, it becomes desirable to provide additional stations in the apparatus following the impregnation zone wherein the volatiles associated with the impregnant in the impregnating solution can be first removed so that the resin impregnated within the board can then be heat cured. It is also desirable to provide for a final means for humidifying the impregnated board to minimize embrittlement of the board.

In accordance with these goals, the apparatus further includes means for continuously circulating a hot gas through the fluted channels of the board bundle as it continuously advances in order to drive off volatiles contained in the liquid impregnating composition. This drying means is sequentially disposed to follow the impregnation zone. The board is cured by providing means, sequentially following the drying of corrugated board, for continuously circulating a hot gas through the fluted channel of the board bundle as it continuously advances, with the gas maintained in contact with he board for a sufficient time and at a sufficient temperature to effectuate curing of the impregnant. Once the impregnant is cured, means are then provided for delivering water into the fluted channels of the advancing board bundle to humidify the board and thereby prevent its embrittlement.

BRIEF DESCRIPTION OF THE DRAWINGS

FIG. 2 is a side elevational view of the apparatus shown in FIG. 1, showing the apparatus in schematic diagrammatic form but yet having some parts shown in true mechanical illustration.

FIG. 3 is a fragmentary perspective view of a typical corrugated board which can be impregnated in accordance with this invention.

FIG. 4 is an end view of the apparatus of FIG. 1, showing in detail the means for forming a bundle of corrugated boards and raising them to the vertical position to commence advancement of the bundle into the apparatus.

FIG. 5 is a vertical section of a fragmentary portion of a board bundle to be treated in accordance with this invention.

FIG. 6 is a fragmentary vertical longitudinal section of the apparatus taken along line 6—6 of FIG. 1.

FIG. 7 is a fragmentary perspective view of the top of the advancing board bundle as it passes through the trough in the impregnation zone of the apparatus.

FIG. 8 is a fragmentary horizontal sectional view taken along the line 8—8 of FIG. 6.

FIG. 9 is a vertical longitudinal sectional view taken along the line 9—9 of FIG. 8, and showing only the impregnant dispensing tank.

FIG. 10 is a vertical cross sectional view through the apparatus at the drying area taken along the line 10—10 of FIG. 6.

FIG. 10a is an isolated perspective view illustrating the drying of the board bundle by countercurrent gas flow.

FIG. 11 is a vertical cross sectional view through the apparatus at the curing area taken along the line 11—11 of FIG. 6.

FIG. 12 is an end view of the right end of the apparatus taken along the line 12—12 of FIG. 2.

FIG. 13 is a vertical sectional view through the pull rolls taken along the line 13—13 of FIG. 1.

FIG. 15 is a view of the left portion of FIG. 8 showing an embodiment of the invention in which the compression belts in the impregnation zone of the apparatus shown in FIG. 8 are replaced by flat plates.

DESCRIPTION OF THE PREFERRED EMBODIMENTS

APPARATUS AND METHOD

Figure 1:
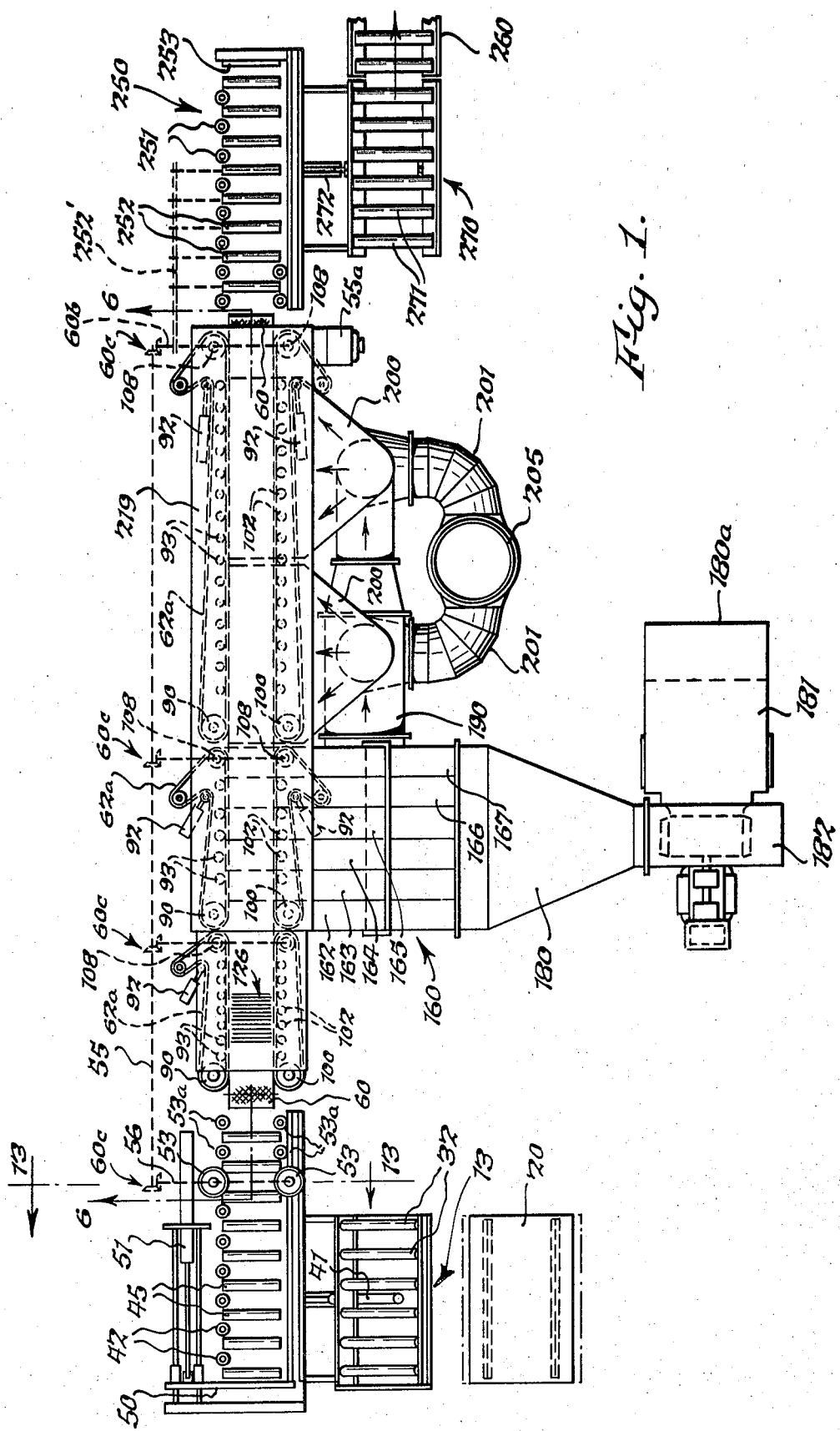
FIG. 1 is a plan view of a preferred embodiment of the apparatus of this invention.

A preferred embodiment of the apparatus of this invention is shown generally in FIGS. 1, 2, 6 and 8. Referring to these figures, and initially to FIG. 1, it is seen that there is provided a pile 20 of corrugated boards stacked horizontally adjacent the apparatus of this invention. The nature of the individual boards in this pile 20 is best understood by reference to FIG. 3. FIG. 3 depicts a typical double backed corrugated board which comprises two cover sheets 21 and 22 and a fluted medium 23 disposed between cover sheets 21 and 22 and adhesively attached to these cover sheets at various points 24. It is seen that fluted media 23 creates a plurality of fluted channels 25 within the board, with all of the channels aligned in a direction which is substantially parallel to each other.

A sheet of masonite 30 (see FIGS. 4 and 5) is first placed upon a tilt table 13 which comprises a plurality of supported and spaced horizontally disposed rollers 32. A plurality of corrugated boards taken from pile 20 is then stacked, one on top of the other, on top of the bottom masonite panel 30. The corrugated boards are arranged into a bundle 40 with the assistance of indexing means (not shown) of a given height which is determined by a height indexing means (also not shown). The bundle 40 of boards is arranged so that the fluted channels 25 of all the boards in the pile will be aligned in a substantially unidirectional manner with the channels 25 being substantially parallel to cylinders 32 of tilt table 13.

Once the bundle 40 of boards has been prepared on tilt table 13, a top panel of masonite 31 is placed on top of the bundle. The function of masonite panels 30 and 31 is to permit application of a substantially uniform compressive force against each side of the bundle as it continuously advances to this apparatus as will be made clear hereinbelow. Of course, the masonite may be replaced with any suitable rigid paneling which would achieve this function which is basically a pressure distribution function.

Referring to FIG. 4, it is seen that as soon as a bundle 40 of corrugated boards is prepared on tilt table 13, this bundle being sandwiched between masonite panels 30 and 31, tilt table 13 is rotated into a substantially vertical position by the extension of air actuated cylinder 41. As bundle 40 is rotated into the vertical position, outer member 31 contacts freely rotatable guide rollers 42 affixed to vertical frame member 43. The lower surface of the bundle 40 is brought to rest on a plurality of freely rotatable support rollers 45 which are mounted on horizontal frame member 45a. It should be noted that when bundle 40 is in the substantially vertical position, that all of the fluted channels 25 of each member making up the bundle are also in a substantially vertical position, as best shown in FIG. 7.

THE IMPREGNATION STEP

Once bundle 40 is in the vertical position and securely resting against vertical rollers 42 atop horizontal rollers 45, the bundle 40 is driven forward by ram 50, which in turn is driven by air actuated cylinder 51, into a pair of vertically mounted pull rolls 53 (see FIG. 13), which are affixed to rigid support members 54, and which frictionally engage the outer members 30 and 31 of bundle 40 and advance bundle 40 through vertical guide rolls 53a towards the impregnation zone of the apparatus. Pull rolls 53 are driven by a rotating shaft 55 through a jack shaft 56 which runs across the apparatus and through a pair 57 of bevel gears. The ram 50 is oversped and the pull rolls 53 are provided with an overriding clutch 58 to allow bundle 40 to catch up with the previous bundle fed into the machine so as to provide abutment between the tail edge and lead edge of adjoining bundles as they pass through the apparatus. As soon as the leading edge of bundle 40 is grasped by pull rolls 53, tilt table 13 is retracted to its original horizontal load position.

Bundle 40 advances through pull rolls 53 and guide rolls 53a to the entrance of the impregnation unit of the apparatus where it becomes supported by a continuously advancing endless transport belt 60 which is preferably fabricated from an open wire mesh. Belt 60 is preferably fabricated from stainless steel. Belt 60 runs the entire length of the apparatus and is mounted on rotating pulleys 60a. Belt 60 is preferably not a single belt continuous throughout the entire apparatus. It is preferably provided in several sections, e.g. a first belt for the impregnation zone, a second belt for the drying zone, and a third belt for the curing zone, in a manner similar to belts 61, 62a and 62b. (see FIG. 8). Belt 60 is shown at its driven end in FIG. 12 where it can be seen that it is driven by jack shaft 60b which runs across the apparatus and to which cylinder 60a is attached. Shaft 60b is driven by motor 55a. Motor 55a also drives shaft 55 through jack shaft 60b and bevel gears 60c.

The lower surfaces 40a (see FIG. 12) of the advancing bundle 40 are frictionally engaged on each side 30 and 31 by a continuously advancing endless belt 61, such as for example, a rubber belt which grasps the bundle and convey it through the apparatus in a given direction. The bundle 40 is typically advanced through the apparatus at a lineal speed of from about one-half to 12, and preferably from about 3 to 6 feet per minute, at least in the impregnation zone of the apparatus.

The top part 40b of bundle 40 (see FIG. 12) engages, on each side, continuously advancing endless frictionless belts 62a, 62b which function to exert a compressive force against the sides of the bundle so as to produce a tight surface-to-surface abutment between the outer surfaces of each individual board comprising bundle 40. Belts 62a, 62b are is typically a Teflon coated cotton belting.

Belts 61 and 62a, 62b extend through the entire length of the impregnation zone. Both belts 61 and 62a, 62b tightly engage the adjacent surfaces of the outermost members of bundle 40 and exert a compressive force against the surfaces to maintain the thickness of the board as close as possible to the additive thicknesses of the individual boards comprising the bundle.

Referring to FIG. 8, it is seen that one frictionless vertical belt 62a is mounted on rotatable vertically mounted pulleys 90 and 91 with tension being applied to belt 62 by means of tensioning device 92. This same belt 62a further communicates, on its inner side, with a bank of rotatable vertically mounted back-up rollers 93 which are rigidly mounted in a stationary fashion to a stationary bracket 94 which, in turn, is mounted to frame 95 via legs 96. It is apparent that belt 62a does not possess any freedom of movement in a direction which is perpendicular to that in which bundle 40 is advancing through the apparatus. The second frictionless belt 62b is similarly mounted on rotatable vertically mounted pulleys 100 and 101, and similarly communicates with a plurality of vertically mounted rotatable back-up rollers 102 which are rigidly mounted in bracket 103. However, bracket 103 is movable in a direction which is perpendicular to the direction in which the bundle 40 is advancing through the apparatus by virtue of its communication with air cylinders 104 which in turn are mounted to frame 105. It is evident that when cylinders 104 are actuated, as by air pressure, mounting bracket 103 will be extended towards bundle 40 carrying belt 62b with it and forcing belt 62b against the upper portion 40b of the outer surface of the outermost member of bundle 40. Since belt 62a is not free to move in a direction perpendicular to the direction in which bundle 40 is advancing because of stationary back-up rollers 93, it serves an an anvil for the compressive forces exerted by belt 62b as cylinders 104 extend in response to air pressure. The effect is to create a compressive force on bundle 40 through the vehicle of belts 62a and 62b.

Disposed beneath endless belts 62a and 62b are rubber belts 61 which contact each side of bundle 40. Belts 61 are mounted in a fashion substantially identical to the mounting of belts 62a and 62b, as shown in FIG. 8, and function in a similar manner to exert a compressive force against the lower portions 40a of the outer surfaces of bundle 40. This is best seen in FIGS. 10 and 11 wherein it can be seen that brackets 94' and 103' correspond to brackets 94 and 103 and back-up rollers 93' and 102' correspond to back-up rollers 93 and 102.

The combined compressive force exerted by belts 62a, 62b and 61 is transmitted across substantially the entire outer surfaces of the bundle as it advances through the impregnation zone by virtue of the rigid masonite sheets 30 and 31 which serve as the outermost members of bundle 40. Belts 62a and 62b are driven by vertical pulleys 90 and 101 respectively, while belt 61 is driven by vertical pulleys 107 disposed beneath pulleys 90 and 91. On each side of the apparatus, these vertical pulleys are affixed to a common vertical shaft 108 which is driven by shaft 55 by bevel gear 109 (see FIG. 12) at its lower end meshing with bevel gear 109a of jackshaft 60b which is connectable to shaft 55 through bevel gears 60c. All of the driven vertical shafts in the apparatus are similarly mounted and driven.

Referring to FIG. 8, it is seen that belts 61, 62a, and 62b do not form a continuous single belt throughout the entire length of the apparatus. Instead separate belts are provided for the impregnation, drying and curing steps. The belt arrangement and pulley system for the drying and curing step is identical to that already described for belts 61, 62a, and 62b with respect to the impregnation zone of the apparatus.

While frictionless belts 62a and 62b engage the upper portion 40b of the outer surfaces of bundle 40, these two belts extend beyond the surfaces of bundle 40 to form the walls 110 and 111, respectively, of a trough, as best seen in FIG. 7, with the top surface 112 of bundle 40 defining the bottom of the trough. The trough, of course, communicates with the vertically aligned fluted channels 25 of bundle 40. It is seen therefore, that frictionless belts 62a and 62b serve a dual function; they serve first to exert a compression force against bundle 40 to assist in maintaining the integrity of the bundle as it passes through the apparatus, and they function as walls of a trough which is formed on top of bundle 40. It is essential that these trough walls be provided at least in the zone of impregnation.

As bundle 40 advances through the trough created by the upper extremities of belts 62a and 62b, a liquid containing the desired impregnant is discharged into the trough whereupon it flows downwardly through fluted channels 25 to impregnate the fluted media 23 as well as cover sheets 21 and 22 of each individual board in the bundle 40.

Referring to FIG. 2, a supply of the required liquid impregnant is maintained in a sump 120. The liquid is pumped from sump 120 by means of a sump pump 121 and a conduit 122 to a constant head reservoir vessel 123 which is disposed above advancing bundle 40. Vessel 123 is provided with an overflow conduit 124 which provides for maintenance of constant head in vessel 123, by returning any overflow to sump 120. Vessel 123 is provided with a discharge valve means 125 which permits discharge of the liquid contained therein at a substantially constant rate into a liquid dispensing tank 126 which is disposed immediately above advancing bundle 40 and the trough formed by the upper extremities 110 and 111 of belts 62a and 62b.

A preferred embodiment of a liquid discharge tank 126 is shown in FIGS. 8 and 9. This tank comprises a rectangular shell 130 and a threaded rod 131 which extends transversely across the shell 130 and through the opposed side walls of shell 130. Depending from threaded rod 131 are a plurality of rods 132 which are slotted at one end to engage pins 131a which are mounted in a rectangular loop of rod 131. The other end of rods 132 have attached thereto a rotatably mounted valve plate of L-configuration 133. Valve plates 133 are pivotally supported on pivotal rods 133a which are mounted in opposed walls of shell 130. These L-shaped valve plates 133 are in contact with each other when vessel 126 is in a non-liquid dispensing mode of operation. To dispense liquid at a controlled rate, rod 131 is moved to the left or the right by means of thumb nuts, a sufficient amount to cause L-shaped valve plates 133 to pivot about the bottom of rod 133a to the point where they no longer contact their adjoining L-shaped valve plate 133. As contact is broken between adjoining L-shaped valve plates 133, a plurality of thin slits are provided in the bottom of vessel 126 which can be adjusted to any given thickness by simply moving rod 131 the required amount. The width of the slots extend across the entire bottom portion of vessel 126 and substantially coincide with the width of bundle 40 passing beneath vessel 126. The slots are substantially perpendicular to the direction in which bundle 40 is advancing.

A variety of liquid impregnating compositions may be used in the apparatus of this invention. A number of these liquid impregnating compositions will be discussed in greater detail hereinbelow. However, a preferred liquid impregnating composition comprises a solution of from about 15 to 25 percent by weight of a urea-formaldehyde resin, from about 4 to 8 percent of a paraffinic wax, a minor amount of a catalyst to effectuate curing of the urea-formaldehyde resin, and the remainder of the composition being a mixture of water and an alcohol such as methanol or ethanol, with the weight ratio of water to alcohol ranging from about 12 to 15.

It can be seen that as the liquid impregnant is deposited into the trough defined by walls 110 and 111 of frictionless belts 62a and 62b, respectively, that the compressive forces exerted against the outer surfaces of bundle 40 will maintain the surfaces of the individual members comprising bundle 40 in tight abutment thereby preventing any contact of the liquid impregnant with these external surfaces of the board. Moreover, since belts 62a and 62b are in tight abutting contact with the outer members of bundle 40, no liquid impregnant will leak out by this route. The residence time of bundle 40 in the impregnation zone can very considerably depending upon a number of factors such as, for example, the amount of impregnant desired in the board and the strength of the impregnating composition.

REMOVAL OF EXCESS IMPREGNANT

After the advancing bundle 40 emerges from the impregnation zone, excess impregnant not already removed by gravity flow is removed from the fluted channels of the bundle by injecting a stream of gas into the fluted channels of the advancing bundle by means of a gas conduit 150 (see FIGS. 2, 6, and 8) which communicates with the channel of bundle 40 and which in turn is provided with a source of gas such as, for example, air by a blower 150a. Excess liquid impregnant which is blown out of the fluted channels of bundle 40 by this treatment trickles through the opening in wire mesh support belt 60 and into sump 120 where it is collected and recycled to the process.

THE DRYING STEP

In the case where the impregnant is a heat curable polymeric resin, it becomes necessary to additionally provide means for removing the volatiles which were associated with the impregnant in the impregnating liquid and thereupon curing the impregnant. It is also desirable following the curing step to provide a means for humidifying the impregnated board to prevent embrittlement. After excess liquid impregnant has been flushed out by air forced through the fluted channels by conduit 150, the fluted channels are next flushed with a stream of a hot gas, such as for example, air, for a sufficient period of time and at a sufficiently high temperature to remove substantially all the volatiles associated with the impregnant in the impregnating liquid. During the drying step, it is desirable to maintain the temperature of the hot gas contacting the advancing bundle 40 sufficiently low to avoid any charring of the board but sufficiently high to permit removal of substantially all the volatiles, preferably at the fastest rate possible. Generally, charring is a function of both temperature and time thereby making it difficult to generalize as to what are preferred temperatures of the drying gas. Generally speaking, however, it is preferable to avoid gas temperatures above about 550°F. It is preferable to use temperatures less than about 425°F. and preferably in the range of 325°–425°F. Any of a variety of gases can be employed for this purpose, such as for example, air, nitrogen, argon, or carbon dioxide. Generally, if the impregnated bundle 40 is contacted with a gas having a temperature in the range of 325°–425°F., a contact time of anywhere from 1 to 5 minutes and typically about 3 minutes is generally quite suitable.

A preferred means for drying the impregnated bundle is illustrated in FIGS. 1, 2, 8 and particularly FIGS. 10 add 10a. This drying means comprises a first bank 160 of conduits which communicates with the upper surface 112 of advancing bundle 40 so as to provide access to the fluted channels of the bundle. Bank 160 comprises a plurality of individual conduits numbered 162 through 167, respectively, with each alternate conduit in bank 160 being a feed and exhaust conduit, respectively. This is, conduits 162, 164 and 166 are feed conduits, while conduits 163, 165 and 167 are exhaust conduits. The drying means further comprises a second bank 170 of conduits substantially identical to bank 160 which communicates with the lower surface 171 of advancing bundle 40, lower edge 171 being opposed to edge 112 with which bank 160 of conduits communicates. This second bank 170 of conduits similarly comprises a plurality of individual conduits numbered 172 through 177, with each alternate conduit being a feed and exhaust conduit, respectively. As best seen in FIG. 10a, first conduit bank 160 is disposed vertically above second conduit bank 170 in such manner as to supply a cooperating exhaust conduit for each feed conduit in either bank, each cooperating exhaust conduit communicating with an edge of the bundle which is opposed to its cooperating feed conduit to thereby provide a countercurrent flow of gas through the fluted channels of the bundle. For example, if conduit 162 is a feed conduit, conduit 172 would be an exhaust conduit, similarly if conduit 173 was a feed conduit, conduit 163 would be an exhaust conduit.

The drying means further includes a feed manifold 180 which communicates with the feed conduits of the first and second bank of conduits, an air inlet 180a communicating with manifold 180, and a means for heating the air 181. Any conventional heating unit can be employed; however, a direct combustion gas burner is preferred.

Referring to FIG. 1, it is seen that air is drawn into feed manifold 180 through air inlet conduit 180a under the influence of blower 182. As the air enters manifold 180, it is heated by direct combustion heater 181 to the required temperature. The dryer means further includes an exhaust manifold 190 which communicates with the exhaust conduits of the first and second bank of conduits.

The operation of the drying means is best shown in FIG. 10. Referring to FIG. 10, it is seen that hot air enters through inlet manifold 180 and is directed through conduit 162 of the upper bank 160 of conduits to communicate with the upper edge 112 of advancing bundle 40. The hot air passes through the fluted channels of bundle 40 and is exhausted to exhaust conduit 172 of second conduit bank 170. Exhaust conduit 172 communicates with exhaust manifold 190. Although FIG. 10 shows only a single conduit in each conduit bank, it is apparent that in the next adjacent conduit, the air flow would be in a direction opposed to that shown in FIG. 10, so as to provide countercurrent flow through the fluted channels of the bundle 40 as it advances through the drying section.

Although feed conduit 162, which is the first conduit to contact bundle 40, flushes gas downwardly through the fluted channels, conduit 162 can be just as well adjusted to flush the gas upwardly through the fluted channels. The conduits 162–167 and 172–177 are conveniently provided with adjustable baffles (not shown) to accommodate the conduits to whatever mode of gas flow is desired. A similar arrangement is made with respect to the conduits of the curing portion of the apparatus.

THE CURING STEP

After the volatiles are driven off from the impregnated bundle 40 in the drying portion of the apparatus, it becomes desirable to direct a flow of a hot gas such as air through the fluted channels of advancing bundle 40 to effectuate curing of the resin impregnant. Again, it is necessary to insure that the temperature of the gas does not exceed a value which causes charring of the board. Generally, in the curing step, it is desirable to maintain the temperature of the gas in contact with the board below about 375°F. The temperature of this gas is preferably maintained at about 300°-350°F. It must be appreciated that the exact temperatures and residence times require to effectuate a cure will vary with the nature of the resin impregnant. However, generally a contact time of from about 3 to 10 minutes, a preferably 5 to 6 minutes will suffice for most applications.

A preferred embodiment of a means for curing the impregnated board is depicted in FIGS. 1, 2, 8 and particularly FIG. 11. Referring to these figures, it is seen that the curing means comprises one or more feed conduits 200 which communicate with the upper surface 112 of advancing bundle 40 so as to provide access of the feed gases to the fluted channels of bundle 40, and one or more exhaust conduits 201 which communicate with the bottom surface 171 of the bundle, said exhaust conduits 201 being vertically disposed beneath feed conduits 200 to cooperating with their corresponding feed conduit 200.

The curing means further includes a conduit 202 for feeding exhaust gases from the drying step to feed conduits 200 from exhaust manifold 190. In the case where more than one exhaust conduit is provided, all of these conduits communicate with an exhaust manifold 205. It is thus seen that the feed gases for the curing step are in effect with exhaust gases from the drying step. The feasibility of this type of an approach will of course depend upon the curing conditions required for the particular resin impregnant being used. It is also apparent that countercurrent flow can be achieved in the curing section of the apparatus by adopting an arrangement similar to that in the drying section wherein the exhaust from the drying section would be fed to the appropriate feed conduits in an upper and lower bank of conduits, with the exhaust conduits in said upper and lower bank of conduits communicating with exhaust conduit 205 from the curing step.

Figure 14:
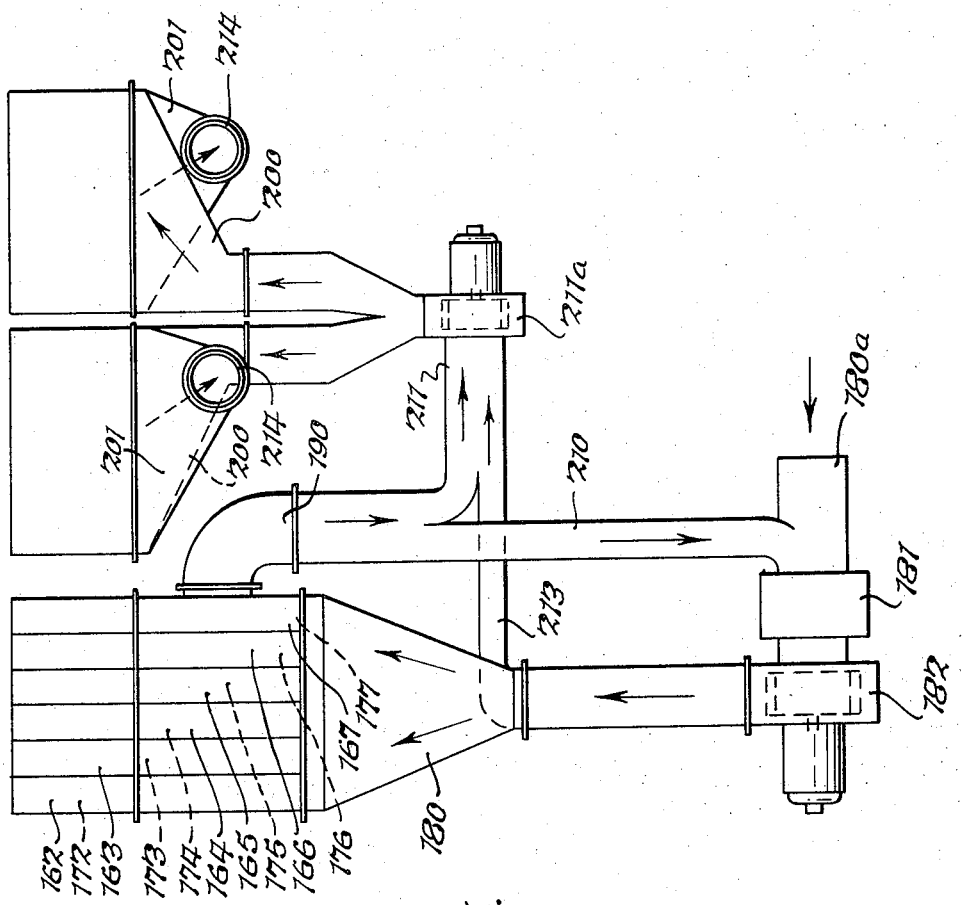
FIG. 14 is a plan view of a preferred embodiment of the hot gas feed and exhaust conduit system in the drying and curing stages of the apparatus, shown in an isolated view.

FIG. 14 depicts another preferred embodiment of a drying and curing apparatus for use in this invention. It will be noted that the dryer portion is substantially identical with that already described except that a portion of the exhaust gas from exhaust manifold 190 of the drying operation are recirculated via recirculating conduit 210 for admixture with fresh air entering through intake conduit 180a prior to the mixture passing through burner 181.

The curing apparatus depicted in FIG. 14, is also substantially identical with that heretofore described except that an intake conduit 211 is provided to communicate with exhaust manifold 190 and feed conduit 213 from the drying operation to provide an admixture of the exhaust air and at least a portion of the fresh heated dry air fed to the drying apparatus. The mixture of exhaust and fresh air taken in through conduit 211 by fan 211a is directed to curing feed conduits 200 and is collected as an exhaust gas by exhaust conduits 201 which, in turn, communicate with exhaust manifolds 214.

In some cases, the exhaust gases from the drying portion of the apparatus will not retain a sufficient amount of heat to permit their use in curing the impregnated resin. In such a case, the arrangement shown in FIG. 14 is particularly useful since it permits the temperature of the feed gas to the curing step to be elevated above that found in the exhaust from the drying step by admixing with the dryer exhaust gas (conduit 190), a portion of the fresh gas intake (conduit 213) which is heated in burner 181 to a temperature which is sufficient to produce the required drying temperatures as well as the required curing temperature in the curing feed conduit 211. The temperature of the gas in conduit 211 is determined by the temperature of the gas in conduits 213 and 190 and the relative proportions in which they are admixed with conduit 211.

THE HUMIDIFICATION STEP

After the advancing bundle 40 has been properly cured, the fluted channels of the bundle are flushed with water which is injected into these channels by shower assembly 220 which is disposed above advancing bundle 40. Shower assembly 220 communicates with water feed conduit 221. The drying, curing and humidification portions of the apparatus can be conveniently enclosed in a hood 291 as shown in FIG. 2.

As advancing bundle 40 enters the drying section, it is engaged by a second set of upper frictionless belts 62a, 62b and a lower set of rubber or hinged metal mesh belts 61 which continue to exert a compressive force against advancing bundle 40 in a manner substantially identical to that described for belts 62a, 62b and 61 in the impregnation zone. This is best seen in FIG. 8. The belts and the pulley system in the drying zone are identical in all respects to those in the impregnation zone.

As advancing bundle 40 enters the curing zone and humidification zone, it engages a third set of upper frictionless belts 62a, 62b and a lower set of rubber or hinged metal mesh belts 61 which are mounted and function to compress the bundle together in a manner substantially identical to that already described for belts 62a, 62b and 61 (see FIG. 8).

It is apparent that the upper frictionless belts 62a, 62b can be replaced with any suitable member which functions to provide trough walls, at least in the impregnation zone, and to exert a compressive force against the edge of the bundle as it advances through the apparatus. For example, and as shown in FIG. 15, belt 62a (see FIG. 8) can be replaced with a stationary flat plate 400 or board of a substantially frictionless material, such as Teflon, which is mounted to a frame such as 95 by legs 96. Similarly, belt 62b (see FIG. 8) can be replaced with an identical strip 401 of a flat frictionless plate (see FIG. 15) made of Teflon which is movable in a direction perpendicular to that in which the bundle 40 is advancing so as to exert, in combination with the stationary anvil plate member 400 on the other side of the bundle, a compressive force against the bundle. In this regard, plate 401 moves in response to the extension of air cylinders 104 which are mounted to frame 105. Alternatively, a combination of belts and plates or board members can be employed.

In another embodiment, belts 61, 62a and 62b can be replaced on each side with a single moving Teflon belt. The top portion of each belt forms the trough walls. One belt is mounted in a stationary manner similar to belt 62a while the other belt is free to move in a direction perpendicular to the direction in which the bundle is advancing in a manner similar to belt 62b. The bundle is advanced through the impregnation zone by vertical pull rollers mounted before and after the Teflon belts. Moreover, belts 61, 62a and 62b are further replaced in the drying and curing zones by a single hinged wire mesh belt on each side of the bundle.

Bundle 40 emerges from the apparatus being propelled by belt 61 onto supporting table 250. Table 250 contains a plurality of vertically mounted rotatable cylinders 251 and a plurality of driven rotatable horizontally mounted support cylinders 252. Cylinders 252 are driven by a chain and sprocket drive 252' from drive shaft 60b. Table 250 is further provided with a stop 253. As used at the feed end of the machine, a tilt table 270 is similarly used at the discharge end to tilt the bundle 40 back to the horizontal position. This tilt table 270 has rollers 271 and an activating piston and cylinder 272 to move it into its up or down position. As soon as the forward end of advancing bundle 40 hits stop 253, bundle 40 is rotated to its horizontal position by table 270 and onto discharge conveyor means 260 with the boards of bundle 40 being in a substantially horizontal position.

A line shaft 55 which runs substantially the entire length of the machine and which is driven by a motor 55a is responsible for driving the pull rolls 53 and the vertically mounted shafts on which are mounted the upper frictionless belts and lower rubber belts of the apparatus. These items are driven by jack shafts running across the apparatus which communicate by intermeshing bevel gears with shaft 55 in a manner similar to the configuration shown in FIG. 13.

To accommodate bundles of variable height, it is desirable to mount certain items of the apparatus on a vertically movable frame, such as is shown in FIG. 12. Referring to FIG. 12, there is shown a vertically slidable second frame 300 which is suspended from the stationary main frame 301 by depending screw rods 302 which fit into the female threaded members 303 of frame 300. Screw rods 302 are rotated at the four corners of the apparatus, as well as in other intermediate areas between. Vertical thrust bearings are provided in frame bosses 305 to rotatably support threaded rods 302. At one corner of the apparatus, a motor reduction unit 306 is incorporated into one of the bosses 305 to rotate depending screw rods 302 to thereby elevate or lower frame 300. All of the shafts 302 have sprockets 302a fitted into their upper extremities above the bosses and a continuous chain 302b which drives each of the shafts 302.

The vertical mounting pulleys 107 for the lower rubber belts 61 are mounted on stationary frame 301 by stationary bearing brackets 311. However, the upper frictionless belts 62a and 62b are mounted on vertical pulleys 91 and 101 which are journaled in brackets 313 mounted on the slidable frame 300. Pulleys 91 and 101 are vertically slidable on shaft 108 which is mounted to movable frame 300. Shaft 108 contains a vertical keyway 315 which permits pulleys 91 and 101 to be locked on shaft 108 once the desired height is reached (see dotted pulleys 91 and 101 in FIG. 12).

In addition to mounting the upper frictionless belts on a vertically slidable frame, it is also convenient to mount on the vertically slidable frame those portions of the drying, curing and humidification means which communicate with the upper surface of advancing bundle 40 and also liquid impregnant dispensing vessel 126. It is apparent that the height of these particular items will vary depending upon the height of the bundle advancing through the apparatus.

IMPREGNATING COMPOSITIONS

Preferred liquid impregnation compositions for corrugated board comprise solutions and emulsions comprising from about 5 to 30 percent by weight of one or more polymeric heat curable impregnants which impart wet rigidity to the board when impregnated therein and cured, from about 2 to 10 percent by weight of a paraffin wax, minor amount of a catalyst to effectuate curing of the heat curable polymeric impregnant, and sufficient carrier liquid selected from the group consisting of water and mixtures of water and one or more organic liquids to make up 100% composition by weight (e.g. 59–93 percent). If the carrier is a mixture of water and an organic liquid, the weight ratio of water to organic liquid should be at least about five to insure that the impregnant does not permeate to the outer surfaces of the corrugated board.

Illustrative polymeric impregnants include urea-formaldehyde resins, phenol-formaldehyde resins, melamine-formaldehyde resins, acrylic resins, styrene resins, and polyurethane resins. A preferred form of a urea-formaldehyde resin is available commercially from Corn Products under the name Comal H998, this product being an aqueous solution of urea-formaldehyde resin containing from about 62 to 65 percent solids. Another preferred resin is commercially available from Gulf Adhesives (formerly Perkins Glue) under the name Perkins No. L100, this product being an aqueous solution of urea formaldehyde resin containing about 60–65 percent solids.

A preferred paraffin wax is commercially available from the American Cyanamid Company under the name of Alwax, this product being a dispersion of a paraffin wax emulsified in water and having from 45 to 50 percent solids.

A preferred catalyst for use with a urea-formaldehyde resin and a paraffin wax is ammonium chloride.

A preferred liquid carrier is water alone or a mixture of water and organic solvents such as, for example, glycerin, ethylene glycol ketonic solvents such as acetone and methylisobutyl ketone, and alkanols containing from one to five carbon atoms such as for example, methanol, ethanol, propanol and n-butanol.

In a preferred liquid impregnating formulation, the amount of resin will range from about 15 to 25 percent by weight, the amount of wax from 4 to 8 percent by weight, the amount of catalyst from 0.1 to 1 percent by weight, and the amount of liquid carrier from about 66 to 76 percent by weight.

Preferred liquid carriers include mixtures of water and either methanol or ethanol wherein the weight ratio of water to organic alcohol ranges from about 12 to 15 and is preferably about 12 to 13.

Several typical preferred liquid impregnating compositions are presented below:

| Ingredient | % by weight | | |
|---|---|---|---|
| | Formula A | Formula B | Formula C |
| urea-formaldehyde resin | 25* | 15* | 25*** |
| paraffin wax | 6.5** | 5.0** | 6.5** |
| methanol | 5 | 5.0 | 5 |
| water | 63.0 | 74.7 | 63 |
| ammonium chloride | 0.5 | 0.3 | 0.5 |

*Comal H 998 (Corn Products, Inc.)
**Alwax (American Cyanamid Co.)
*** Perkins No. 100 (Perkins, Inc.)

In the above formulations, methanol can be replaced by ethanol and the ratio of water to alcohol can vary from that shown. Moreover, the relative proportions of all the components can vary considerably as discussed hereinabove. The ammonium chloride functions as a curing catalyst for the urea-formaldehyde resin. The above formulations have typical viscosities in the range of 30 to 40 centiposes at ambient temperatures.

CORRUGATED BOARD

It has been found that when impregnating compositions containing as a liquid carrier water or a mixture of water and an organic solvent are flushed through the fluted channels of the corrugated board, the impregnant dissolved or dispersed in the composition impregnates the fluted medium and the cover sheets of the board, but substantially none of the impregnant permeates sufficiently far into the cover sheets to reach the outside surfaces of the cover sheets, thereby creating a corrugated board whose outside surfaces are substantially free from impregnant.

The impregnated corrugated board of this invention typically contains from about 4 to 50 percent, and preferably 8 to 20 percent by weight of impregnant. The amount of wax contained in the finished corrugated board preferably amounts to from about one-fourth to one-half the weight of impregnant in the board. These boards are characterized by unusually good wet rigidity properties.

It must be realized that a variety of liquid impregnating compositions other than those specifically described hereinabove can be employed in the method and apparatus of this invention. For example, a conventionally used molten wax impregnating composition or a variety of other known liquid impregnating compositions could be employed as well as liquid impregnating compositions which comprise solutions or emulsions of one or more impregnating agents in water, organic solvent, or mixtures thereof as carriers. However, it is found that it is only when the liquid impregnating compositions contain as a carrier liquid for the impregnant, water or mixtures or water and organic solvent wherein water comprises a substantial amount of the mixture that the composition does not permeate entirely through the cover sheets of the board to the outer surfaces of the board when it is flushed through the fluted channels of the board in accordance with the method and apparatus of this invention.

The novel corrugated board compositions prepared in accordance with the method and apparatus of this invention, and employing the aqueous or aqueous-organic liquid based impregnating compositions of this invention, display an unusually high degree of wet rigidity. For example, a box made from corrugated board can be defined to possess 100 percent wet rigidity when, after the box is immersed in water for 3 hours, it will stand the same top to bottom compression load as a totally untreated dry box of the same shape and size. A box prepared from an unimpregnated corrugated board will ordinarily withstand substantially no top to bottom compression load and consequently will have virtually no wet rigidity. On the other hand, a box prepared from a corrugated board impregnated with wax in a conventional manner will typically withstand only about 20% of the top to bottom compression load of an equivalent dry unimpregnated box of the same shape and size.

It has been found that when a box is prepared from corrugated board which is impregnated with the novel liquid impregnating compositions of this invention, the box will withstand from about 60 to 70 percent of the top to bottom compression load of a dry unimpregnated box of the same shape and size. From such data, it can be seen that the novel corrugated board of this invention, although the outer surfaces are substantially free from impregnant and resemble the desirable texture and appearance of an unimpregnated board, it nevertheless possess a wet rigidity which is anywhere from about three to 3½ times greater than that possessed by the widely used wax impregnated corrugated board.

It is to be understood that the specific embodiment of the method, apparatus, corrugated board, and liquid impregnating compositions of this invention which are described hereinabove are illustrative only and that such modifications and alterations therein as would be suggested to one skilled in the art are deemed to fall within the scope and spirit of the claims appended hereto.

What is claimed is:

1. Apparatus for impregnating a corrugated board comprising:
   a. conveyor means for continuously advancing a bundle comprising a plurality of corrugated boards in a given direction, with the fluted channels of said boards in substantially unidirectional alignment throughout said bundle;
   b. support means for continuously supporting said board bundle as it advances;
   c. compression means for continuously applying to the outer surfaces of the outermost members of said advancing boards bundle a compressive force sufficient to maintain the surfaces of adjoining boards in the bundle in tight abutment as the bundle is advanced, at least a portion of said compression means forming the walls of a trough, at least in the zone of impregnation, the bottom of said trough being defined by a surface of said advancing bundle which provides access to said aligned fluted channels of said boards, so as to provide communication between said trough and said aligned fluted channels, said trough walls being in tight abutment against at least the upper portions of the outer surfaces of the outermost members of said bundle; and d. liquid delivery means for continuously delivering an impregnating liquid into said trough whereupon said liquid passes into the fluted channels of the boards to impregnate the interior surfaces of said boards but without spilling onto the outer surfaces of said boards.

2. The apparatus of claim 1 further including:

i. drying means sequentially following said liquid delivery means for continuously circulating a hot gas through the fluted channels of said board bundle as it continuously advances in order to drive off volatiles contained in the impregnating liquid;

ii. curing means sequentially following said drying means for continuously circulating a hot gas through the fluted channels of said board bundle as it continuously advances at a sufficient temperature and for a sufficient time to effectuate curing of the impregnant; and iii. humidification means sequentially following said curing means for delivering water into the fluted channels of said board bundle as it continuously advances.

3. The apparatus of claim 2 further including gas injection means for passing a gas through said fluted channels of said bundle, said gas injection means being disposed between said liquid delivery means and said drying means, said gas injection means functioning to flush out excess impregnating liquid from said fluted channels.

4. The apparatus of claim 3 wherein said conveyor means comprises:

i. a pair of advancing endless friction belts each disposed to frictionally communicate with at least a portion of the lower outer surfaces of the outermost members of said bundle.

5. The apparatus of claim 4 wherein said compression means comprise:

ii. a pair of substantially frictionless advancing endless belts each disposed to communicate with at least a portion of the upper outer surfaces of the outermost members of said bundle, the upper part of each frictionless belt extending beyond the upper outer surface of the outermost board of the bundle with which it communicates to form the walls of a trough, said trough communicating with the fluted channels of the bundle; and iii. means for compressing both the friction and frictionless belts against the outermost members of the bundle to maintain all of the members of the bundle in tight surface-to-surface abutment as the bundle continuously advances and to provide a substantially leakproof seal between the frictionless belts and the portions of the upper outer surfaces of the outermost members of the bundle with which they communicate.

6. The apparatus of claim 3 wherein said conveyor means comprises:

i. an advancing endless friction belt disposed to frictionally communicate with at least a portion of the lower outer surface of the bundle; and wherein said compression means comprises ii. a flat stationary frictionless plate member and a flat movable frictionless plate member which is movable in a direction perpendicular to that in which said bundle is advancing, each of said plate members disposed to communicate with at least a portion of opposed outer surfaces of the bundle, each of said plate members extending beyond the upper outer surface with which each communicates to define the walls of a trough which communicates with the fluted channels of the bundle; and iii. means for compressing the movable frictionless plate against the outermost member of the bundle with which it communicates to effect compression of the advancing bundle between the stationary plate member and the movable plate member.

7. The apparatus of claim 3 wherein said support means comprises an endless advancing open mesh screen belt.

8. The apparatus of claim 3 wherein said fluid delivery means comprises:

a. a constant head reservoir vessel;

b. liquid feed conduit means communicating with said vessel;

c. a liquid dispensing tank disposed above said trough which communicates with the fluted channels of said advancing bundle, said tank provided with at least one bottom opening of controllable dimensions for discharge of fluid into said trough; and d. conduit means for delivering liquid from said reservoir vessel to said tank.

9. The apparatus of claim 8 wherein said support means is an advancing open mesh wire belt and further including i. a receptacle vessel disposed beneath said advancing bundle and said open mesh wire belt in substantially vertical alignment with said liquid dispensing tank to collect liquid draining from the fluted channels of the advancing bundle and through the open mesh wire belt; and ii. means for recycling the contents of said receptacle vessel to said reservoir vessel.

10. The apparatus of claim 9 wherein said liquid dispensing tank contains a flat bottom having disposed therein a plurality of spaced substantially parallel slots, said slots disposed perpendicularly to the direction in which the bundle is advancing, the width of said slots being substantially that of the advancing bundle, and further including means for adjusting the thickness of said slot to a given dimension.

11. The apparatus of claim 3 wherein said drying means comprises:

i. a gas feed conduit communicating with a surface of the advancing bundle which provides access to the fluted channels of the bundles;

ii. means for supplying a gas to said gas feed conduit;

iii. means for heating said gas;

iv. a gas exhaust conduit communicating with a surface of the advancing bundle which provides access to the fluted channels of the bundle but which is opposed to the surface with which said feed conduit communicates, said feed and exhaust conduits being in substantially cooperative alignment on opposed edges of the advancing bundle.

12. The apparatus of claim 11 wherein there is provided a plurality of feed and exhaust conduits, said feed and exhaust conduits alternating on each edge of the bundle to provide a countercurrent circulation through the fluted channels of the bundle.

13. The apparatus of claim 12 wherein said curing means comprises:
   i. a gas feed conduit communicating with an edge of the advancing bundle which provides access to the fluted channels of the bundles;
   ii. means for feeding the gas from the exhaust conduit of said drying means to said curing feed conduit;
   iii. a gas exhaust conduit communicating with an edge of the advancing bundle which provides access to the fluted channels of the bundle but which is opposed to the edge with which said curing feed conduit communicates, said curing feed and exhaust conduits being in substantially cooperative alignment on opposed edges of the advancing bundle.

14. The apparatus of claim 13 wherein said feed conduit of said curing means communicates with said feed conduit of said drying means whereby a portion of the hot gas fed to said drying means is diverted to said feed conduit of said curing means, and further including:
   i. recirculating conduit means for recirculating at least a portion of the exhaust gas from said drying means to said means for heating said gas and to the feed conduit of said dryer means; and
   ii. conduit means for supplying dryer exhaust gas to said feed conduit of said curing means, said conduit means communicating at one end with said exhaust conduit of said drying means and with the feed conduit of said curing means at the other end whereby the dryer exhaust gas supplied from said conduit means and a portion of the hot gas fed to the dryer supplied from said recirculating conduit means are admixed in said feed conduit of said curing means.

15. The apparatus of claim 3 further including:
   i. a vertically movable frame;
   ii. means for vertically moving said frame in an up and down direction; and
   iii. said compression means, said liquid delivery means, said feed and exhaust conduits of said drying and curing means, and said humidification means being mounted on said frame to accommodate said items to varying heights of the bundle advancing through the apparatus.

16. Apparatus for continuously impregnating a corrugated board comprising:
   a. conveyor means for continuously advancing a bundle comprising a plurality of corrugated boards in a given direction, with the fluted channels of said boards in substantially unidirection vertical alignment throughout said bundle;
   b. support means for continuously supporting said board bundle as it advances, said support means comprising a continuously advancing endless belt of an open wire mesh;
   c. compression means for continuously applying to the outer surfaces of the outermost members of said advancing bundle a compressive force distributed over substantially said entire outer surfaces to maintain the surfaces of adjoining boards in the bundle in tight abutment as the bundle is advanced, at least a portion of said compressive means extending beyond the upper portions of the outer surfaces of the outermost members of the bundle to form the walls of a trough, at least in the zone of impregnation, the bottom of said trough being defined by the top surface of the advancing bundle which provides access to the aligned fluted channels of the boards so as to provide communication between said trough and said aligned fluted channels, said trough walls being in tight abutment against at least the upper portions of the outer surfaces of the outermost members of said bundle;
   d. liquid delivery means for continuously delivering an impregnating liquid into said trough whereupon said fluid passes into the fluted channels of the boards to impregnate the interior surfaces of said boards without spilling liquid onto the outer surfaces of the boards, said liquid delivery means comprising:
      i. a constant head reservoir vessel disposed above said advancing bundle;
      ii. liquid feed conduit means communicating with said reservoir vessel;
      iii. a liquid dispensing tank disposed above said advancing bundle having a flat bottom containing therein a plurality of substantially evenly spaced parallel slots of an adjustable thickness, the width of said slots being substantially the same as the width of the advancing bundle, said slots being disposed in a substantially perpendicular direction to the direction in which the bundle is advancing; and
      iv. conduit means for supplying liquid from said reservoir vessel to said dispensing tank;
   e. gas injection means sequentially following said liquid delivery means for continuously passing a gas through said fluted channels of said advancing bundle to purge excess impregnating liquid therefrom;
   f. drying means sequentially following said fluid delivery means for continuously circulating a hot gas through the fluted channels of said continuously advancing board bundle in order to drive off volatiles contained in the impregnating liquid, said drying means comprising:
      i. a first bank of conduits communicating with the upper surface of the advancing bundle which provides access to the fluted channels of the bundle, said first bank comprising a plurality of individual conduits, each alternate conduit being a feed and exhaust conduit respectively;
      ii. a second bank of conduits communicating with the lower surface of the advancing bundle, said lower surface being opposed to the surface which communicates with said first bank of conduits, said second bank comprising a plurality of individual conduits, each alternate conduit being a feed and exhaust conduit respectively; said two conduit banks disposed so as to supply a cooperating exhaust conduit for each feed conduit, said cooperating exhaust conduit communicating with a surface of the bundle opposed to its cooperating feed conduit thereby providing a countercurrent flow of gas through the fluted channels of the bundle;

iii. a feed manifold communicating with said feed conduits of said first and second bank of conduits;
iv. means for supplying a gas to said feed manifold;
v. means for heating said gas disposed in said feed manifold;
vi. an exhaust manifold communicating with said exhaust conduits of said first and second bank of conduits; and
vii. recirculating conduit means communicating at one end with said exhaust manifold and at the other end with said feed manifold for recirculating at least a portion of the exhaust gas to said heating means and said feed manifold;

g. curing means sequentially following said drying means for continuously circulating a hot gas through the fluted channels of the advancing board bundle for a sufficient time and at a sufficient temperature to effectuate curing of the solids of the impregnating liquid, said curing means comprising:

i. a feed conduit communicating with the top surface of the advancing bundle which provides access to fluted channels of the boards;
ii. an exhaust conduit communicating with the bottom surface of the bundle;
iii. conduit means communicating with said feed manifold of said drying means for supplying dryer feed gas to said feed conduit;
iv. conduit means providing communication between said feed conduit and said exhaust manifold of said drying means for supplying exhaust gas from the dryer means to the feed conduit of the curing means so as to provide for mixing of dryer feed gas and dryer exhaust gas; and h. water spraying means disposed above the advancing bundle, and sequentially following said curing means, for delivering water to the fluted channels of the advancing board bundle.

* * * * *

UNITED STATES PATENT OFFICE
CERTIFICATE OF CORRECTION

Patent No. 3,695,219             Dated October 3, 1972

Inventor(s) Charles Mourad Arian, et al.

It is certified that error appears in the above-identified patent and that said Letters Patent are hereby corrected as shown below:

Column 1, lines 1-2, replace "CORRUGATED BOARD IMPREGNATION APPARATUS" by -- ABSTRACT (continued) --;

Column 1, lines 19-20, insert between lines 19-20 --CORRUGATED BOARD IMPREGNATION APPARATUS --;

Column 3, line 63,   "he" should be -- the --;

Column 6, line 36,   after "are" delete -- is --;

Column 9, line 65,   "add" should be -- and --;

Column 11, line 17,  "a" should be -- and --;

Column 12, line 29,  "291" should be -- 219 --;

Column 14, line 54,  after "glycol" insert -- , --;

Column 17, line 35,  delete "i.";

Column 17, line 42,  "ii." should be -- i. --;

Column 17, line 51,  "iii." should be -- ii. --.

Signed and sealed this 3rd day of April 1973.

(SEAL)
Attest:

EDWARD M. FLETCHER, JR.                    ROBERT GOTTSCHALK
Attesting Officer                          Commissioner of Patents